United States Patent
Aasoori et al.

(10) Patent No.: US 11,049,058 B2
(45) Date of Patent: Jun. 29, 2021

(54) SYSTEM AND METHOD FOR IMPROVING PERFORMANCE IN AN ENTERPRISE COMPUTING ENVIRONMENT

(71) Applicant: Morgan Stanley Services Group Inc., New York, NY (US)

(72) Inventors: Radhika Aasoori, Edison, NJ (US); Kranthi Darapu, Jersey City, NJ (US)

(73) Assignee: Morgan Stanley Services Group Inc., New York, NY (US)

(*) Notice: Subject to any disclaimer, the term of this patent is extended or adjusted under 35 U.S.C. 154(b) by 113 days.

(21) Appl. No.: 16/430,611

(22) Filed: Jun. 4, 2019

(65) Prior Publication Data
US 2020/0387845 A1 Dec. 10, 2020

(51) Int. Cl.
G06Q 10/06 (2012.01)
G06N 5/04 (2006.01)
G06N 3/08 (2006.01)

(52) U.S. Cl.
CPC ....... *G06Q 10/06375* (2013.01); *G06N 3/084* (2013.01); *G06N 5/045* (2013.01)

(58) Field of Classification Search
CPC ..................................................... G06Q 10/06
See application file for complete search history.

(56) References Cited

U.S. PATENT DOCUMENTS

| 7,545,965 | B2 | 6/2009 | Suzuki et al. |
| 2002/0165745 | A1 | 11/2002 | Greene et al. |
| 2007/0005740 | A1 | 1/2007 | DiFalco et al. |
| 2007/0100712 | A1 | 5/2007 | Kilpatrick et al. |
| 2007/0100892 | A1 | 5/2007 | Kephart et al. |
| 2007/0168874 | A1 | 7/2007 | Kloeffer et al. |
| 2011/0068935 | A1* | 3/2011 | Riley ............ A61B 5/024 340/575 |
| 2012/0226670 | A1 | 9/2012 | Arcushin et al. |
| 2013/0332594 | A1 | 12/2013 | Dvir et al. |
| 2015/0333992 | A1* | 11/2015 | Vasseur ......... H04L 12/4641 370/252 |
| 2016/0050222 | A1 | 2/2016 | Iyer et al. |
| 2016/0134422 | A1 | 5/2016 | Smith et al. |
| 2017/0243117 | A1 | 8/2017 | Kephart et al. |
| 2017/0357812 | A1 | 12/2017 | Lerner |

OTHER PUBLICATIONS

Karpathy et al., Deep Visual-Semantic Alignments for Generating Image Descriptions, Computer Vision Pattern Recognition, ArXiv:1412.2306 (Jun. 2015).
Donahue et al., Long-term Recurrent Convolutional Networks for Visual Recognition and Description, ArXiv:1411.4389v4 (May 2016).

* cited by examiner

*Primary Examiner* — Kurtis Gills
(74) *Attorney, Agent, or Firm* — Weitzman Law Offices, LLC

(57) ABSTRACT

A system for improving performance in an enterprise computing environment is disclosed and involves a change registry vault, including a machine learning model that analyzes whether or not implementation of a change will result in adverse operation of a component of the enterprise computing environment if the change is released, and takes different actions depending upon a result of that analysis. A corresponding method is also disclosed.

10 Claims, 3 Drawing Sheets

SYSTEM AND METHOD FOR IMPROVING PERFORMANCE IN AN ENTERPRISE COMPUTING ENVIRONMENT

FIELD OF THE INVENTION

This disclosure relates generally to computer systems and, more particularly, to an enterprise scale environment involving heterogeneous hardware and software.

BACKGROUND

Enterprise computing environments are highly complex, often involving many seemingly discrete silos of permutations and combinations of hundreds or even thousands of heterogeneous computers, user profiles, software applications, databases, networks etc. with varying degrees of direct and indirect interrelationships and dependencies among them. Moreover, maintenance of those heterogeneous computers, user profiles, networks, software applications, databases, etc. often involves deploying updates (hardware and/or software) and/or patches, as needed within a silo or some subset thereof. However, the overarching complexity means that seemingly innocuous or silo-tested changes can have unintended negative effects on parts of the enterprise environment that are seemingly unconnected to the part where the change occurred. .With the frequency and complexity of changes increasing day by day and with the consequences of the failed changes being greater than ever, the IT Personnel evaluating the changes are facing problems which includes getting visibility into all the changes that are scheduled or happening across the enterprise and these IT personnel have to make difficult decisions about where to spend their limited time in their evaluation process. Change managers evaluation process is guided by traditional rules based on intuition and past experience and typically have low success rate preventing change failures.

By way of simple example, two seemingly unrelated software applications may be running in a distributed manner on multiple servers, where one of those servers is shared in common. If an update is made to one of the two applications and that update causes occasional errors involving, for example, periodic server reboots, they may never adversely impact the application causing the reboots, but those reboots can have a serious adverse effect on the other of the two applications even though they are otherwise unrelated—as they only share that server in common. Likewise, if that program periodically uses substantial resources of one of the servers, that could cause an adverse effect on other programs running, in part, on that server—even though, individually, all of the programs, when tested, run fine and have no problems at all. Similarly, even a seemingly positive change could have an adverse effect. For example, increasing the memory capacity of a specific server may seem like a positive improvement. However, that improvement could cause that server to now have excess capacity that another program may take advantage of. In doing so, that usage can have an adverse effect on some other program that originally ran on that server due to the added CPU utilization by the new program.

Thus, there is an ongoing technological problem within the enterprise computing field that is rooted in, and unique to, the complexity inherent in enterprise scale computing environments that makes it difficult, and highly time consuming, to identify the potential direct and indirect impact of a change, specifically the impact a change could have on seemingly unrelated part of the environment.

SUMMARY

We have devised a technical solution to the foregoing problem that improves the functioning and uptime of an enterprise computing environment. Our technical solution remedies the foregoing technological problems that are unique to this environment by using machine learning techniques to automatically identify whether any hardware or software change made anywhere within the enterprise computing environment is the likely cause of some adverse operation, saving enormous time and money and improving the enterprise environment hardware and software infrastructure itself by preventing implementation of changes that will potentially cause unforseeable adverse operation directly on the related system or elsewhere within the enterprise computing environment beyond the components to which a change applies, thereby improving operation of the enterprise computing environment by reducing operational downtime.

Variants of our solution improve the operation of the enterprise computing environment infrastructure because they use machine learning techniques to learn whether a change to be made within the enterprise computing environment will have an unintended effect in the environment or, at least, to assess whether, if an unintended effect might be caused, where such unintended effect might manifest itself. Thereby, in the former case, off-line testing of the change relative to seemingly unrelated, but relevant, parts can be performed as pre-release troubleshooting, and in the latter case, the potentially affected parts can specifically be known and directly monitored for issues as the change is applied.

One aspect of this disclosure involves a system for improving performance in an enterprise computing environment. The system involves a change registry vault including a change release evaluation engine, and a change database. The change release evaluation engine comprises at least one processor, memory and programming implementing a machine learning model. The machine learning model is trained to output an adverse operation score, based upon analysis of input change characteristics for an intended change, the adverse operation score being indicative of a likelihood that implementation of the change will result in adverse operation of a component of the enterprise computing environment if the change is released. The change release evaluation engine is constructed to compare an adverse operation score for a specific change to a threshold and, if the adverse operation score for the specific change a) satisfies the threshold, issue an alert and block release of the specific change into the enterprise computing environment, or b) does not satisfy the threshold, release the specific change for automatic application within the enterprise computing environment.

Another aspect involves a method of improving performance in an enterprise computing environment. The method involves a) receiving change characteristics for a change intended to be released for at least one component of the enterprise computing environment; b) inputting the change characteristics into a trained machine learning model, the machine learning model having been trained to analyze sets of characteristics for a proposed change and output an adverse operation score corresponding to the proposed change that is indicative of a likelihood that implementation of the proposed change will result in adverse operation of a component of the enterprise computing environment if the proposed change is released; c) comparing an adverse operation score for the change output by the trained machine learning model against a threshold and, if the adverse operation score for the change i) satisfies the threshold, issue an alert and block release of the change into the enterprise computing environment, or ii) does not satisfy the threshold, schedule and release the change for automatic application within the enterprise computing environment.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

The aforementioned problem(s) notably only arise(s) in the context of enterprise computing environments because such environments are often too complex for any human to fully comprehend their extent and the functional indirect interrelationships that may exist within them. This complexity often means that changes can seemingly be fully tested and cleared for their intended environment, but due to the unknown interrelationships, those changes, when released, can have adverse consequences for seemingly unrelated aspects of the enterprise.

Systems and methods embodying the teachings described herein apply machine learning to ascertain information that cannot ever be done by humans because it would be impossible for any human to obtain, coordinate, analyze, and understand the collective information for the entire enterprise at all, let alone be able to discern how a change to one component of the enterprise computing environment might adversely affect some other, seemingly unrelated, component(s) of the enterprise computing environment because there are simply too many discrete "silos" of operation, variations in components and configurations and potential changes.

For purposes of this description, unless otherwise specifically stated, the term "storage" is intended to mean any storage medium that stores data, data-containing structures, and/or program instructions in a non-transitory manner, for example, such as non-transient solid state memory, a magnetic hard drive, a CD or DVD, a tape drive, or an analogous or equivalent storage medium type would.

Figure 1:
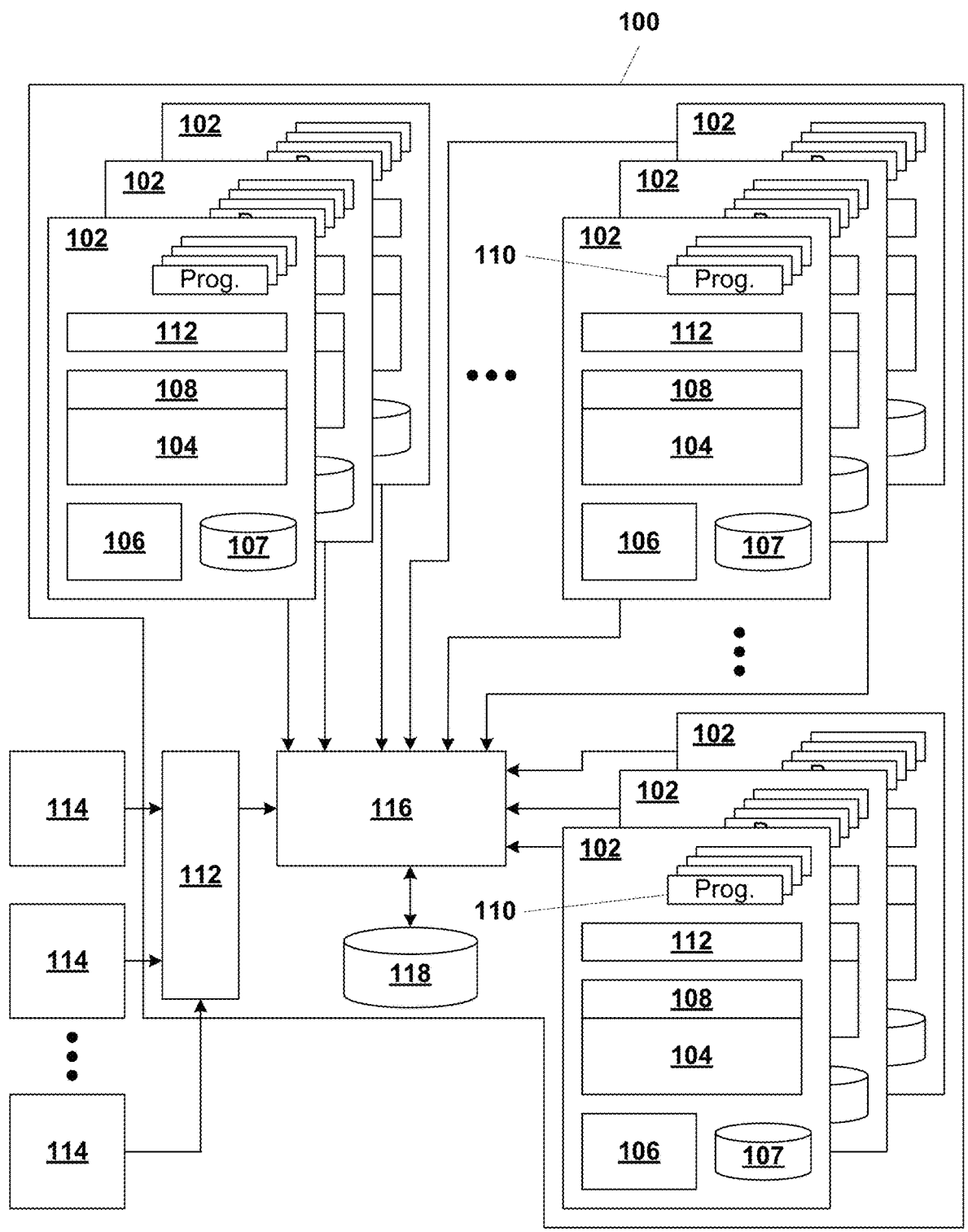
FIG. 1 illustrates, in simplified form, a representative example of an enterprise computing environment incorporating one example variant system incorporating our solution.

FIG. 1 illustrates, in simplified form, a representative example of an enterprise computing environment 100 incorporating one example variant system incorporating our solution. As shown, the enterprise computing environment 100 is made up of hundreds, if not thousands, of computers 102. Within the enterprise computing environment 100, each such computer 102 includes at least one processor 104, RAM 106, non-transient storage 107, at least one operating system (OS) 108, and may further include programs 110, for example any one or more of: word processors, spreadsheets, communication programs, browsers, trading programs, news programs, accounting programs, databases, company-specific or company-proprietary programs, etc. The computers 102 of the enterprise computing environment 100 can include, for example, servers, desktop computers, laptop computers, minicomputers, mainframe computers, and, in some cases, may also include tablet computers and smart phones. In addition, the computers 102 that are part of the enterprise computing environment 100 each include at least one agent 112 that is typically implemented, in whole or part, as software and monitors certain aspects of the performance of the computer 102, as well as changes that are made to the computer 102.

For purposes of understanding the systems and methods described herein, the enterprise computing environment 100 may include multiple third-party-controlled (e.g., vendor supplied) components 114 that exist outside the enterprise computing environment 100, for example, externally running programs and/or packages or data feeds, which are directly used by some of the computers or applications, or upon which some of the computers or applications rely for input. Finally, the enterprise computing environment 100 includes a change registry vault 116 and central database 118.

Figure 2:
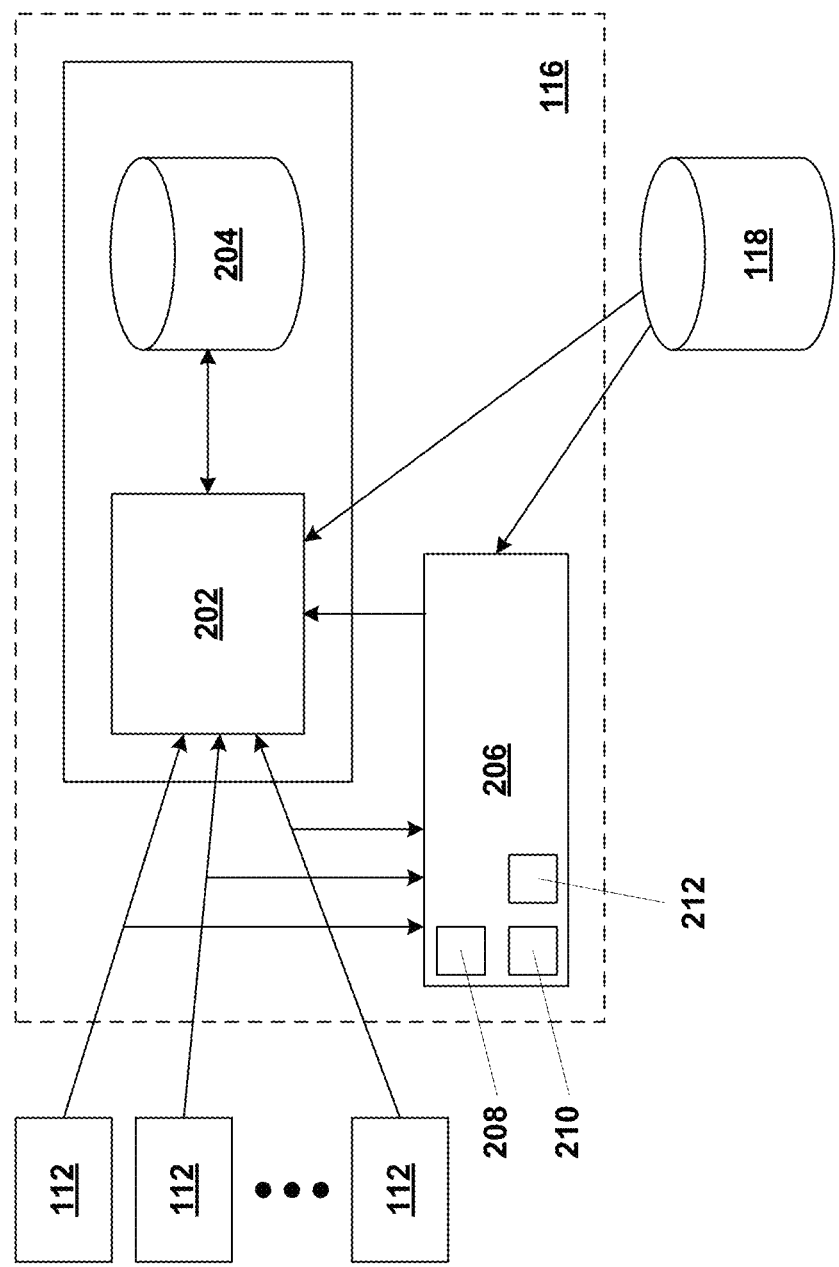
FIG. 2 illustrates, in simplified form, a more detailed view of the functional components of the change registry vault in context.

FIG. 2 illustrates, in simplified form, a more detailed view of the functional components of the change registry vault 116 in context. As shown, the change registry vault is made up of a database management system (DBMS) 202, an associated change database 204 maintained in non-transitory storage, and a Change Release Evaluation Engine (CREE) 206. The CREE is a programmed computer, or part of a programmed computer, that is made up at least of one or more processors 208, memory 210 (e.g., RAM and/or ROM) containing programming and capable of storing data for use by the one or more processors 208, and I/O 212. Of course, depending upon the particular implementation, the CREE can also include things like keyboards, a mouse, a display, a printer, non-transitory storage.

The change database 204 contains stored information such as change characteristics for requested changes and results of prior generations by the CREE 206 of Adverse Operation Scores (AOS) for prior changes. Change characteristics can include, for example, information such as the change date, change time, system(s) directly impacted, change requestor, requestor group, change deployment process, change scope, etc. The DBMS 202 manages the data contained in the change database 204, i.e., it stores, retrieves, arranges, sorts and otherwise processes data in the change database 204. Depending upon the circumstances, the information the DBMS 202 will store within the change database can come from, for example, agents 112 running on various components within the enterprise computing environment 100, or the central database 118.

The agents 112, inter alia, transfer information to the change registry vault 116, which may include information such as, a change request, date, time, requestor, percentage of code that changed, deployment steps, etc. The agents 112 may transmit the information regarding newly requested changes in real time, or periodically, (e.g., on a batch basis each day) to the change registry vault 116. In addition, the central database 118 may also update or augment information regarding prior changes for which information has been previously stored.

When a change is to occur for one or more components of the enterprise computing environment 100, a user enters a change request which is captured by an associated agent 112. Once a change request has been entered, the change can be queued up for automatic release, but the change cannot be released until the CREE generates its AOS and the AOS meets an acceptable threshold level.

Following capture of a change request, the associated agent 112 then sends either change data (including key change attributes) or a change identifier to the CREE 206. If the CREE 206 receives a change identifier, it uses that change identifier to access the central database system 118 and retrieve characteristic data associated with the change. If the CREE 206 receives the change data, it may use that information directly as received, or it may augment that information (if necessary) with information obtained from either the change database 204 or central database 118, and, using machine learning techniques, calculates an AOS for the requested change. The AOS represents a probability that the change will have an adverse impact on one or more components of the enterprise computing environment 100 over and above those components to which the change will directly be applied. In general, the AOS will be compared with a threshold and, depending upon what the AOS is relative to the threshold, either the change will be released for application or it will be blocked from release.

Figure 3:
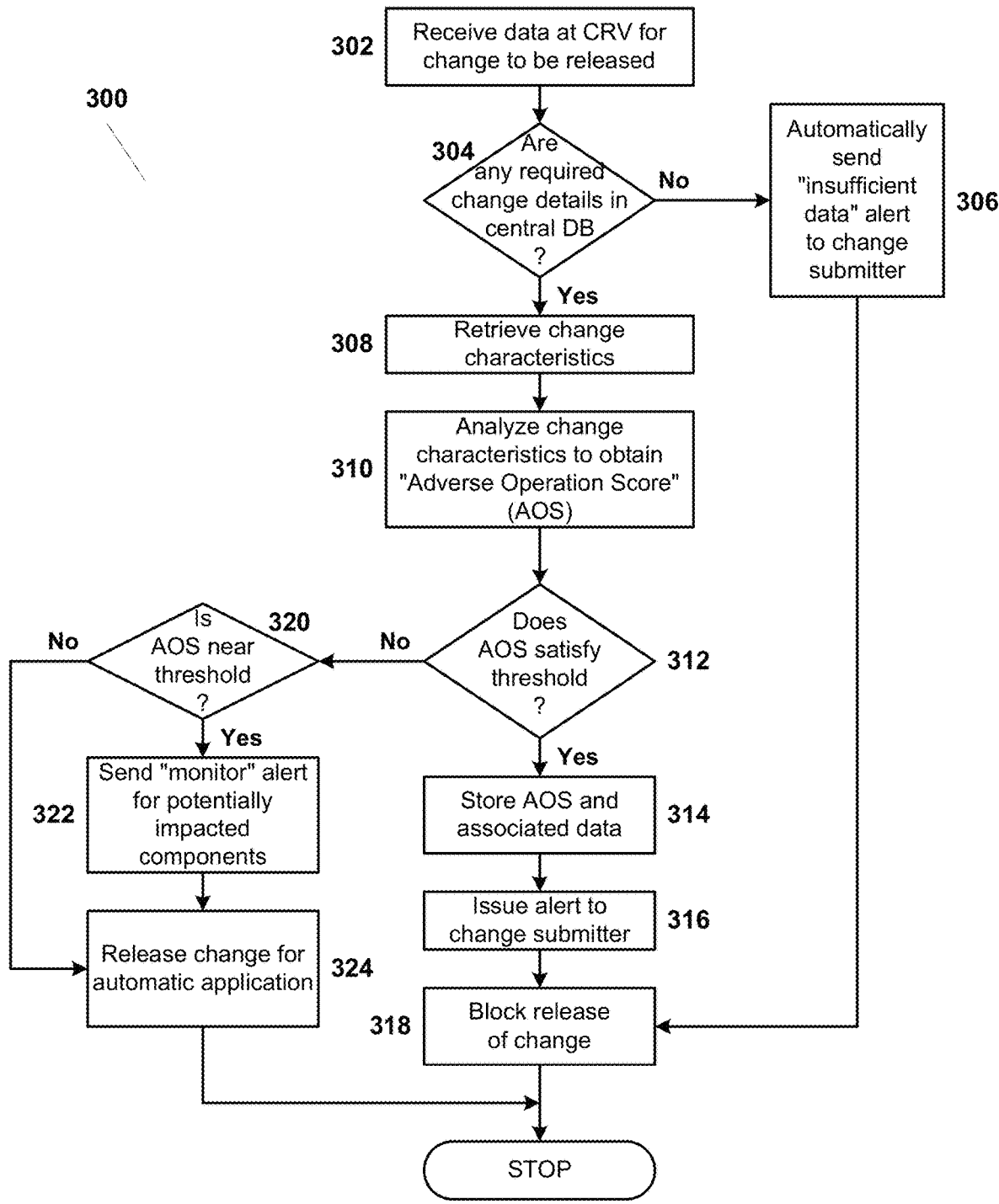
FIG. 3 illustrates, in simplified form, a flowchart for one aspect of the operation of the change registry vault.

FIG. 3 illustrates, in simplified form, a flowchart 300 for one aspect of the operation of the change registry vault (CRV) 116. The process is executed by the one or more processors of the CREE 208 based upon execution of program instructions stored in the memory 210.

The process begins when data relating to a change to be released is received (Step 302) at the CRV 116. The CREE 208 then checks the associated change information that was also received, and stored by the DBMS 202 in the change database 204, to ascertain if all required information is present and, if not, whether the required information is present in the central database 118 (Step 304). If neither is the case, the CREE 208 automatically sends an alert message back to the change submitter indicating that it has insufficient data to evaluate the AOS for the change (Step 306). If, on the other hand, the required change information is present in either the change database 204 or central database 118, the change information is retrieved (Step 308). The change information will include, inter alia, a unique identifier for the change, the change requestor, the scheduled date and time for release of the change for application, the components to be changed, any other known impacted components (for example, those that need to be stopped while the change is implemented) along with change characteristics information that will be evaluated by the CREE 208 using machine learning techniques (which will be described in greater detail below). The CREE 208 will then analyze the change characteristics and output an AOS value for the change (Step 310). Next, the CREE 208 will check to see if the AOS for the change satisfies a threshold value (Step 312), meaning that there is a high probability that the change will likely have an adverse impact on some other part of the enterprise computing environment 100. When the threshold value is satisfied, the AOS and associated data will be stored, either in the change database 204 or the central database 118 (Step 314), an alert will automatically be sent to the change submitter (Step 316) and release of the change will be blocked (Step. 318). Moreover, the storing (Step 314) may also include augmented information set by the CREE, for example, if a particular change satisfies the threshold, a flag or marker may also be set in the change database 204 or central database 118 for use in analyzing future changes, under the assumption that a change that is similar to a prior change that had an AOS that satisfied the threshold, and involves similar components is more likely to also have an AOS that satisfies the threshold.

Likewise, if an "insufficient data" alert was sent (Step 306), release of the change will be blocked (Step. 318).

However, if the AOS does not satisfy the threshold the CREE 208 checks whether the AOS is nevertheless close to the threshold (Step 320), with "close" being dependent upon the particular implementation. However, as a general matter, "close" can be determined by setting a second "value" or level that will simply automatically trigger some further action by the CREE 208 to automatically occur. For example, as shown in FIG. 3, if the AOS is sufficiently close to the threshold, the CREE 208 will automatically send a "monitor" alert to relevant personnel (Step 322), for example, the change submitter and the IT person(s) responsible for the indicated potentially impacted components of the enterprise computing environment 100 so that, when the change is released, those components can be closely monitored to see whether, in fact, any adverse operation occurs. Once the "monitor" alert has been sent, or if the AOS is not sufficiently close to the threshold, the change is set to release for automatic application as scheduled (Step 324).

Table 1 below identifies the change characteristics that will be evaluated by the CREE 208, using machine learning, in order to arrive at, and output, an AOS value for the change, along with the specific unit of measurement that will be used in the evaluation.

TABLE 1

| Change Characteristic | Unit of Measurement |
| --- | --- |
| Change Size | Percentage of Code Changed |
| Sprint Planning | Average Story Points per (2 week) Sprint |
| Code Commit Pattern | Commits/Pull Request Patterns (Per Sprint) |
| Code Violations | Code Violation Category |
| Code Review | Code Review Patterns |
| Functional Testing | Automated Test Coverage Percentages |
| Dependency scan | Number of Dependent Modules |
| Code Quality | Defect Density Percentage |
| Performance Testing | Test Execution Status |
| Security Scan | Test Execution Status |
| Change Type | New vs Update Existing |
| Impacted Applications | Number of Applications |

TABLE 1-continued

| Change Characteristic | Unit of Measurement |
|---|---|
| Change Acquaintance/Familiarity | Number of Recently Implemented Changes |
| Impacted End Users | Number of Users Impacted |
| Type of Application | Internal vs External User Base |
| Impacted Enterprise Component | Component Type |
| Rollback | Time To Rollback Changes |
| Recent Changes | Prior Change Implementation Status |
| Enterprise Application(s) Impact | Impacted Parties (Many Downstream Applications vs Self-Contained) |
| Implementation Time | Change Window |
| Maintainability | Documentation Score |
| Checkout Procedures | Checkout Complexity In Terms Of Time Taken |
| Monitoring Procedures | Monitoring Metric Complexity (Collectable Metrics) |
| Infrastructure Zone | Change Location - (Internal/DMZ/Cloud) |
| Implementation Procedures | Change Execution (Manual vs Automated) |
| If Implemented By Manual Change | # Of Similar Previous Changes By The Implementer |
| Change Type | New vs Update Existing |
| Impacted Applications | Number of Applications |
| Change Acquaintance/Familiarity | Number of Recently Implemented Changes |
| Impacted End Users | Number of Users Impacted |
| Type of Application | Internal vs External User Base |
| Impacted Enterprise Component | Component Type |
| Rollback | Time To Rollback Changes |
| Recent Changes | Prior Change Implementation Status |
| Enterprise Application(s) Impact | Impacted Parties (Many Downstream Applications vs Self-Contained) |
| Implementation Time | Change Window |
| Maintainability | Documentation Score |
| Checkout Procedures | Checkout Complexity In Terms Of Time Taken |
| Monitoring Procedures | Monitoring Metric Complexity (Collectable Metrics) |
| Infrastructure Zone | Change Location - (Internal/DMZ/Cloud) |
| Implementation Procedures | Change Execution (Manual vs Automated) |
| If Implemented By Manual Change | Number Of Similar Changes Implemented By The Implementer |
| Request Type | Existing Request From Catalogue vs Ad-Hoc |
| Request Category | Risk Level |

Depending upon the particular implementation, the AOS value provided by the CREE 208 may be numerical (e.g., a number on a scale from 1 to 100), or may be more generally stated as levels (e. g., "low", "medium", "high", etc.). Various predictive or statistical models may be used in analyzing the characteristics and assigning an AOS. Two alternative machine learning approaches are described below to obtain the AOS: 1) using a linear weighted combination of the factors implemented in the CREE 208, and 2) an artificial neural network implemented within the CREE 208.

1) AOS Computation Through Linear Weighted Combination

For the linear combination approach, the AOS is computed through a linear combination of the discrete change characteristic parameters, weighted by their importance in determining the likelihood that a change or series of changes will result in an adverse operation event. In one format, an initial unsealed AOS may be computed as $$AOS = \sum_{i=1}^{n} A_i X_i$$

where X is the value of a change characteristic and each $A_i$ is a weighted pre-selected, but adjustable, coefficient of the linear combination, which may be positive (indicating that the value of that parameter term increases overall likelihood of an adverse operation event) or negative (indicating that the value of that parameter term reduces the overall likelihood of an adverse operation event). For example, high value coefficients may be warranted if, for example, the change requestor has a historical high number failed changes, the change implementation process requires manual steps, the change does not have defined rollback process, or the change implementation cannot be verified except during peak business hours. Likewise, low value coefficients may be warranted if, for example, the percentage of changed code is low and, for example, there are no dependent modules or known impacted parties beyond the components being changed.

The values of the individual characteristics may be a binary "1" or "0" function, or they could be other values such as integers, or real numbers. The magnitude and sign of the coefficients "A", are selected based on an appropriate technique, such as proposing trial coefficients for known prior failed changes and then adjusting the coefficients until an appropriate level is matched. The coefficients may be evaluated by analyzing changes that were not indicated as potentially causing an adverse operation, but did cause some adverse operation, by automatically back propagating the errors into the CREE 208 so that it can adjust the coefficients until a low risk score is produced. The coefficients may also be evaluated by back propagating change information errors into the CREE 208 where the AOS value is close to the threshold for an approved release.

In practice, the linear combination result may be scaled to any appropriate range, for instance a 1-100 numerical scale, a binary (i.e., "go"—"no go") scale, a range scale such as "low," "medium," or "high," or a Fibonacci sequence scale. Moreover, although, in the above description, the threshold and calculations are such that exceeding the threshold indicates that the change is likely to cause adverse operation, it is to be understood that the analysis can be straightforwardly implemented such that the inverse (i.e., falling below the threshold) indicates that the change is likely to cause adverse operation—the important aspect being that some value is used to determine whether a change can be released or not.

As an alternative to using a linear weighted combination, a nonlinear approach may be used, such as applying power exponents to the individual change characteristics (i.e., the "X" values);. An exponential combination approach may be particularly useful, for example, where certain individual characteristics are found to be extremely sensitive indicators that adverse operation may result from a change, or may not indicate that adverse operation may result until their absolute value reaches some level.

The AOS computation can also be implemented using artificial neural network models.

In this approach, the CREE 208 is implemented using an artificial neural network. Data sets comprising change characteristics for changes that resulted in adverse operation events somewhere within the enterprise computing environment, and change characteristics for changes that did not result in adverse operation events somewhere within the enterprise computing environment are compiled as training data. The training data is submitted to a multilayer neural network model that will be part of the CREE 208 and, through a conventional training technique, the network will converge to produce an AOS that takes inputs of change characteristic parameters and quantifies an AOS based on its previously trained network weights. In this manner, a highly nonlinear relationship may be represented between the change characteristics and a likelihood that a change will effect an adverse operation event somewhere within the enterprise computing environment.

Up to now, the discussion has been focused on processing a single change, however, it is to be understood and appreciated that the same approach can be used where a "change" is actually made up of multiple discrete changes or several interrelated changes. In the simplest case, in some instances, the multiple changes, if highly interrelated, can be treated as a single change. Alternatively, for multiple more complex and discrete changes, each of the multiple changes can be treated individually, particularly where the multiple changes must be applied in a sequence. Advantageously, in this way, if a change that is early in the sequence will likely cause an adverse operation event, that change can be addressed and the IT personnel are not left with figuring out which of the multiple changes was the cause, nor do they have to deal with sequentially rolling back the changes to try and isolate the cause—particularly when the adverse operational event will be in a part of the complex enterprise computing environment that, at best, has some peripheral relationship to the component(s) to which the changes were applied. Moreover, by independently analyzing the multiple changes, in some cases, it may be possible to implement some of the changes while others cannot be released, but must be revised.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A system for improving performance in an enterprise computing environment by controlling release of software changes into the enterprise computing environment that may adversely impact operation of a seemingly unrelated component within the enterprise computing environment, the system comprising:
  a change registry vault including
    a change release evaluation engine (CREE),
    a database management system (DBMS), and
    a change database, maintained in non-transitory storage and coupled to the DBMS, the change database having stored therein change characteristics and associated adverse operation scores for previously released changes within the enterprise computing environment;
  wherein the CREE comprises at least one processor, memory and programming implementing a machine learning model;
  wherein the machine learning model of the CREE is trained to output an adverse operation score (AOS), for an intended change to software for a part of the enterprise computing environment received by the machine learning model of the CREE, based upon analysis of, in combination, many input change characteristics associated with the intended change, wherein the associated input change characteristics include
    a) Change Size, if involving software change,
    b) Code Commit Pattern, if involving software change,
    c) Code Violations, if involving software change,
    d) Code Review, if involving software change,
    e) Functional Testing,
    f) Dependency scan,
    g) Code Quality, if involving software change,
    h) Performance Testing,
    i) Security Scan,
    j) Change Type,
    k) Impacted Applications,
    l) Change Acquaintance/Familiarity,
    m) Impacted End Users,
    n) Type of Application,
    o) Impacted Enterprise Component,
    p) Rollback, if involving software change,
    q) Recent Changes,
    r) Enterprise Application(s) Impact,
    s) Implementation Time,
    t) Maintainability,
    u) Checkout Procedures,
    v) Monitoring Procedures,
    w) Infrastructure Zone,
    x) Implementation Procedures,
    y) Request Type, and
    z) Request Category,
  the AOS output by the machine learning model of the CREE being indicative of a likelihood that implementation of the intended change within the enterprise computing environment will result in adverse operation of at least one software or hardware component of the enterprise computing environment if the intended change is released; and
    wherein the CREE is constructed to compare an AOS output by the machine learning model of the CREE, for a specific software change, output by the machine learning model to a threshold and, if the AOS for the specific change
      a) satisfies the threshold, issue an alert and block release of the specific software change into the enterprise computing environment, or
      b) does not satisfy the threshold, release the specific software change for automatic application within the enterprise computing environment.

2. The system of claim 1, further comprising:
software agents running on computers within the enterprise computing environment that are each programmed to communicate a ready to release change to the Change Registry Vault for analysis by the CREE.

3. The system of claim 1, wherein the change registry vault is constructed to back propagate an error to the CREE when an applied change that had an associated AOS that did not satisfy the threshold resulted in adverse operation of one or more components of the enterprise computing environment.

4. The system of claim 1, wherein the machine learning model implements a linear weighted combination approach to the analysis of the change characteristics for the intended change.

5. The system of claim 1, wherein the machine learning based model implements a multilayer neural network including an exponential combination approach to the analysis of the change characteristics for the intended change.

6. A method of improving performance in an enterprise computing environment by controlling release of a software or hardware change that is proposed and may adversely impact a component of the enterprise computing environment that is seemingly unrelated to a target of the software or hardware change, the method comprising:
i) receiving change characteristics for a proposed change intended to be released for at least one component of the enterprise computing environment, wherein the change characteristics include many of
 a) Change Size, if involving software change,
 b) Code Commit Pattern, if involving software change,
 c) Code Violations, if involving software change,
 d) Code Review, if involving software change,
 e) Functional Testing,
 f) Dependency scan,
 g) Code Quality, if involving software change,
 h) Performance Testing,
 i) Security Scan,
 j) Change Type,
 k) Impacted Applications,
 l) Change Acquaintance/Familiarity,
 m) Impacted End Users,
 n) Type of Application,
 o) Impacted Enterprise Component,
 p) Rollback, if involving software change,
 q) Recent Changes,
 r) Enterprise Application(s) Impact,
 s) Implementation Time,
 t) Maintainability,
 u) Checkout Procedures,
 v) Monitoring Procedures,
 w) Infrastructure Zone,
 x) Implementation Procedures,
 y) Request Type, and
 z) Request Category;
ii) inputting the change characteristics into a trained multilayer neural network, the trained multilayer neural network having been trained to analyze sets of input change characteristics and output an adverse operation score (AOS) corresponding to the proposed change that is indicative of a likelihood that implementation of the proposed change will result in adverse operation of a seemingly unrelated component of the enterprise computing environment if the proposed change is released;
iii) comparing an AOS for the proposed change output by the trained multilayer neural network against a threshold and, if the AOS for the proposed change
 a) satisfies the threshold, issue an alert and block release of the proposed change into the enterprise computing environment, or
 b) does not satisfy the threshold, release the proposed change for application within the enterprise computing environment.

7. The method of claim 6, wherein, prior to "i)", the method comprises:
training the multilayer neural network using
 sets of change characteristics for changes that resulted in adverse operation events somewhere within the enterprise computing environment, and
 sets of change characteristics for changes that did not result in adverse operation events somewhere within the enterprise computing environment.

8. The method of claim 6, further comprising:
when a released change results in an adverse operation event within the enterprise computing environment, back propagating an error to the multilayer neural network reflecting, for the released change, details of the adverse operation event and the released change's change characteristics.

9. The method of claim 6, wherein between "i)" and "ii)", the method comprises:
determining that the received change characteristics lack required details;
automatically sending an "insufficient data" alert to a submitter of the change intended to be released; and
blocking release of the change intended to be released.

10. The method of claim 6, wherein when the AOS for the change does not satisfy the threshold but the AOS is close to the threshold, the method further comprises:
sending a "monitor" alert to relevant IT personnel identifying the change intended to be released, a release schedule, and potentially impacted components within the enterprise computing environment.

* * * * *